(12) United States Patent
Estrera et al.

(10) Patent No.: US 9,420,202 B1
(45) Date of Patent: Aug. 16, 2016

(54) COMPACT INTENSIFIED CAMERA MODULE

(71) Applicant: Aviation Specialties Unlimited, Inc., Boise, ID (US)

(72) Inventors: Joseph Estrera, Dallas, TX (US); John Glesener, Mesa, AZ (US); Clyde James Smittle, Allen, TX (US); Jason Verne Liebert, Wylie, TX (US)

(73) Assignee: Aviation Specialties Unlimited, Inc., Boise, ID (US)

( * ) Notice: Subject to any disclaimer, the term of this patent is extended or adjusted under 35 U.S.C. 154(b) by 0 days.

(21) Appl. No.: 14/675,859

(22) Filed: Apr. 1, 2015

(51) Int. Cl.
*H04N 5/238* (2006.01)
*H04N 5/225* (2006.01)

(52) U.S. Cl.
CPC ............. *H04N 5/238* (2013.01); *H04N 5/2253* (2013.01); *H04N 5/2254* (2013.01)

(58) Field of Classification Search
CPC ... H04N 5/238; H04N 5/2254; H04N 5/2253; G02B 23/12; G02B 23/125; G02B 13/16; G03B 39/005; A61B 6/4225; G01J 2001/4493; G01J 2003/2896; G01N 2021/1778; G01T 1/1645
See application file for complete search history.

(56) References Cited

U.S. PATENT DOCUMENTS

| | | | |
|---|---|---|---|
| 4,655,562 A | 4/1987 | Kreitzer et al. | |
| 4,974,089 A * | 11/1990 | Gilligan | H04N 5/2253 348/217.1 |
| 5,029,963 A | 7/1991 | Naselli et al. | |
| 5,909,309 A | 6/1999 | Di Taranto et al. | |
| 6,049,435 A | 4/2000 | Abe | |
| 6,059,720 A * | 5/2000 | Furusawa | H04N 5/2354 348/76 |
| 6,285,018 B1 | 9/2001 | Aebi et al. | |
| 6,288,839 B1 | 9/2001 | Nelson et al. | |
| 6,320,703 B1 | 11/2001 | Chen et al. | |
| 6,657,178 B2 | 12/2003 | Aebi | |
| 7,015,452 B2 | 3/2006 | Benz et al. | |
| 7,129,464 B2 | 10/2006 | Buchin | |
| 7,193,214 B1 * | 3/2007 | Pittman | H04N 5/2254 250/330 |
| 7,317,578 B2 | 1/2008 | Drazic et al. | |

(Continued)

FOREIGN PATENT DOCUMENTS

WO 2013043215 A1 3/2013

OTHER PUBLICATIONS

"ZeroCam" Intensified Camera for Astronomy, by Stan Moore, undated, http://www.stanmooreastro.com/ZeroCam.htm.

(Continued)

*Primary Examiner* — Jason Flohre
(74) *Attorney, Agent, or Firm* — Marsteller & Associates, P.C.

(57) ABSTRACT

A compact viewing device (M) has a receiving sensor assembly (10) with a display (12) that generates a visible output image (14) and an output sensor assembly (16) that receives and processes the visible output image (14) from the receiving sensor assembly (10) into an electronic image format. A wide field of view (WFOV) lens assembly (18) conveys the visible output image (14) from the receiving sensor assembly (10) to the output sensor assembly (16). The WFOV lens assembly (18) is positioned between the receiving sensor assembly (10) and the output sensor assembly (16), and has a central longitudinal axis (20) through the WFOV lens assembly (18) that is co-linear with both a central optical axis (22) of the receiving sensor assembly (10) and having an centered input sensor (42) which is co-linear with the central longitudinal axis (20).

18 Claims, 2 Drawing Sheets

(56) References Cited

U.S. PATENT DOCUMENTS

| | | |
|---|---|---|
| 8,488,257 B2 | 7/2013 | Stark |
| 8,503,113 B2 | 8/2013 | Huang et al. |
| 2013/0155244 A1* | 6/2013 | O'Rourke .......... H04N 5/23241 348/158 |

OTHER PUBLICATIONS

Sofradir—EC Night Vision Imaging, Sofradir EC Night Vision Imaging of Fairfield, NJ, copyrighted 2015, http://www.nightvisioncameras.com/nv-intensifiers.html.

"Concepts in Digital Imaging Technology, Proximity-Focused Image Intensifiers", by Kenneth R. Spring and Michael W. Davidson, Hamamatsu, undated, http://hamamatsu.magnet.fsu.edu/articles/proximity.html.

Digital Imaging in Optical Microscopy—Concepts in Digital Imaging—Proximity-Focused Image Intensifiers, Olympus Microscopy Resource Center, by Kenneth R. Spring and Michael W. Davidson, copyrighted 2012, http://www.olympusmicro.com/primer/digitalimaging/concepts/proximity.html.

Edmund Optics of Barrington, NJ, US, stock No. 45-759, http://www.edmundoptics.com/microscopy/relay-lenses-couplers/relay-lenses/45759/.

* cited by examiner

COMPACT INTENSIFIED CAMERA MODULE

BACKGROUND OF THE INVENTION

1. Technical Field

The invention relates to the field of camera systems used for imaging of low light scenes, and more particularly to a reduced in size image intensified camera system.

2. Background Art

Imaging systems for low light level or other low visibility situations are well known and include various types of infrared and image intensifier tube imaging systems.

An image intensifier tube is a vacuum electronics device that is used to amplify light. An image intensifier uses a photocathode to convert the light from an imaged scene into electrons. The electrons are amplified by a thin disc array of millions of channels known as a micro channel plate (MCP). The electrons output from the MCP impinge on a phosphor screen. The phosphor screen is fabricated on one side of a cylindrical fiber optic array. At the opposite end of the array, the resulting amplified image can be viewed. Employment for military uses has resulted in the production of hundreds of thousands of image intensifiers. Typically, these image intensifiers are mass produced in standard industry configurations with the capability of amplifying imagery presented at the 18 mm diameter input. The intensified image is available at the 18 mm diameter image output.

Digital image intensified cameras seek to faithfully transfer the output image produced by an image intensifier tube assembly to a camera chip in order to allow digital dissemination of the intensifier output image. Digital image intensified cameras can be divided into three categories: (1) intensified cameras where the camera chip sensor is directly integrated into the vacuum envelope of the image intensifier, negating the need for a phosphor screen; (2) intensified cameras where the camera chip is physically joined, possibly to a fiber optic taper, to the intensifier external fiber optic output; and, (3) intensified cameras where the image intensifier tube is used as is and an external assembly of intermediate optics between the image intensifier and the camera imaging chip is used relay the image.

U.S. Pat. No. 5,909,309 ("Di Taranto") by Di Taranto et al. teaches about the use of magnifying and demagnifying optics in an optical train containing an image intensifier as a way to modulate the image size with a design goal in reducing image distortion caused by vignetting. Di Taranto describes an optical train as accommodating various sizes of the image intensifier input and output areas. Commercially available image intensifiers have fixed sized circular active input and outputs capable of handling imagery up to a diameter of 18 mm. Di Taranto gives the same optical subassembly two different designations. These two assemblies are denoted as the format matching assembly and the relay lens assembly. As drawn and described, these two notationally different assemblies are functionally identical in the patent.

Di Taranto's design has several disadvantages. Di Taranto's design takes an existing commercial camera, video camera or camcorder system and inserts two sets of optics and an image intensifier tube between the original camera objective lens and the original camera body. This design essentially uses two relay lens assemblies. One relay assembly, positioned in front of the image intensifier is between the original camera objective lens assembly and the image intensifier. The second relay lens assembly is positioned after the image intensifier. The use of two relay lenses lengthens the optical train and furthermore, a longer optical train makes the entire assembly unwieldy. Di Taranto's patent in configuring a flat focal plane at the output of the image intensifier assembly does not allow for the fact that the high majority of commercially available image intensifiers have concave fiber optic outputs transmitting the intensified imagery. In using a concave fiber optic output, the output of the image intensifier will have a curved image plane. In the Di Taranto patent, while the original camera objective lens will certainly be designed to correct for chromatic aberration, the Di Taranto patent does not consider that the relay lens assembly between the original objective lens and the image intensifier will also have to be designed to correct for chromatic aberration. Di Taranto's design is not practical in that the image intensifier has to be powered. The cylindrical tube containing the image intensifier will have to be punctured to accommodate wires from a battery pack to power the intensifier. Furthermore, the Di Taranto patent is limited to the utilization of image intensification to commercial camera systems with the correspondingly matched, detachable objective lenses. Finally, needless complication is introduced in having to customize the mechanical mechanisms of attaching to different camera systems and customizing both relay lens assemblies to different camera objective lens/body combinations.

U.S. Pat. No. 6,285,018 (the '018 patent) teaches about a device which incorporates a camera chip inside the vacuum envelope. While this device is compact and it does provide a digitized image, it has several drawbacks. The '018 device does not have a microchannel plate (MCP). Because the MCP provides electron amplification, the lack a MCP unfortunately results in having a camera system with less overall optical gain than an image intensifier tube. Furthermore, camera chips that function inside a vacuum are specialty components. These special chips must meet vacuum compatibility requirements that require fabrication with materials that do not outgas contaminates into the internal ultra high vacuum environment of the device. The special nature of these imaging chips limits the rate of imaging improvement because the development costs for higher pixel count sensors have to be averaged over much smaller production quantities. The pixilation of these devices is currently 1600 pixels×1200 pixels, which renders a digital image with less resolution than that of an image intensifier tube.

U.S. Pat. No. 7,015,452 (the '452 patent) teaches about a device with both the microchannel plate and the camera chip inside the vacuum envelope. While the addition of a microchannel plate improves the optical gain of the image intensifier assembly, the supported resolution of the vacuum co-located camera chip is still smaller than that of the MCP and photocathode components. The addition of an MCP and the camera chip in the same envelope also complicates the vacuum processing and sealing of an image intensifier. Prior to the sealing of an image intensifier tube, the intensifier tube components will have been subjected to a high temperature vacuum process. This high temperature vacuum process outgasses the individual internal intensifier components, particularly the MCP with its millions of cylindrical channels in a timely manner. With the addition of a camera chip sensor, the maximum temperature at which the image intensifier assembly can be subjected to is greatly reduced because the maximum temperature that the camera chip can be continuously exposed is around 100 degrees centigrade. Therefore, the processing time is exponentially increased and manufacturing throughput is reduced.

U.S. Pat. No. 7,129,464 teaches a strategy for system compactness in the adoption of a specialty fiber optic taper as the relay optic between the image intensifier and the pixilated camera chip. This taper is in intimate contact with both components. The camera chip in this type of system is also a specialty item. The coverglass or microlens array in material contact with the camera pixel array must be absent in order to enable direct physical contact with the fiber optic taper. Furthermore, not all pixilated camera chips have the removal of the coverglass or microlens array as an available option. This direct optical contact is important for bonding and maximally maintaining image resolution. The custom fiber optic taper matches the image field of the intensifier output to the camera chip format, both of which can be of different lateral dimensions. The image intensifier tube, the custom fiber optic taper, and the pixilated camera chip are glued together. The glue layer by design is as thin as possible to maximize resolution and light transmission. Gluing together all three optical components is an expensive, artisanal process and can be irreversible. Furthermore, the mechanical stability of the glue-glass joint is an issue across large changes in temperature. The permanency of this gluing process makes the upgrading of any individual component expensive and difficult. See, U.S. Pat. No. 7,129,464.

U.S. Pat. No. 6,320,703 (the '703 patent) is an example of a device that uses a spherical wide field of view lens as the input lens for the optical system. One of the optical system possibilities mentioned is an image intensifier based system. The optical train in the '703 patent configures the image intensifier in question to have a fiber optic input. This fiber optic input must also have a spherical concave surface on the input side of the fiber optic. The spherical optic is seated in direct contact with the spherical fiber optic surface in some sort of "shell" optic. As noted in U.S. Pat. No. 8,488,257 there is a disadvantage in optically fusing the entire plane of the two ball lenses.

While the above cited references introduce and disclose a number of noteworthy advances and technological improvements within the art, none completely fulfills the specific objectives achieved by this invention.

DISCLOSURE OF INVENTION

Image intensified camera systems are either bulky or otherwise of such as size as to make their transport and use somewhat restrictive. Typically, the longest characteristic system dimension is the objective lens—image intensifier—relay lens—camera optical axis. Methods in making these systems more compact and lightweight are much sought after. This patent focuses on reducing the length of this optical axis.

In accordance with the present invention, a compact viewing device has a receiving sensor assembly that accepts an image at its input. The receiving sensor assembly generates a visible output image of an imaged scene and an output sensor assembly that receives and processes the visible output image from the receiving sensor assembly into an electronic image format. A wide field of view (WFOV) lens assembly conveys the visible output image from the receiving sensor assembly to the output sensor assembly. The WFOV lens assembly is positioned between the receiving sensor assembly and the output sensor assembly, and has a central longitudinal optical axis through the WFOV lens assembly that is co-linear with both a central optical axis of the receiving sensor assembly and a receiving directional axis of the output sensor assembly. Centered on the receiving directional axis of the output sensor assembly is an image sensor that intercepts the image transferred from WFOV lens.

Preferably, the central longitudinal optical axis through the WFOV lens assembly, the central displaying optical axis of the receiving sensor assembly, and the receiving directional axis of the output sensor assembly are all co-linear.

In the present invention, the WFOV relay lens assembly is imaging the backend of an image intensifier tube and is not the first lens. There is no need for a second relay lens in front of the image intensifier assembly. Furthermore, this invention employs a small wide field of view (WFOV) lens as the relay optical assembly from the image intensifier to the camera. The use of a small WFOV lens as a relay optic in intensified cameras is a unique feature. This is because of use of intensified cameras in fields as disparate such as military imaging systems and biomedical imaging are known to require undistorted imagery. All known image intensified cameras to date make rectilinear output imagery a cornerstone requirement. The design of any relay optics used in an intensified camera system reflects this cornerstone requirement. The present patent trades the non-rectilinear distortion present in compact wide field of view lenses for the benefits accrued in reducing the weight, the overall length of intensified camera systems, and consequently the camera system cost.

The use of a compact WFOV lens confers several important benefits that result in the reduction of the size and weight of an intensified camera. First, on the WFOV lens input side, utilization of a WFOV lens exploits the large optical acceptance angle inherent in this type of optical assembly. In the case of the present invention, the larger input acceptance angle of the WFOV relay lens enables a larger field of view. This larger field of view allows the lens to be moved closer to the image intensifier fiber optic output. Wide field of view lenses can be designed and produced with very short focal lengths that further facilitates this closer placement. Secondly, compact WFOV lenses have reduced weights because the WFOV lens input optics couple the incoming light into a smaller diameter lens assembly. This is to be contrasted with catalog relay optics where the maximum usable image diameter is smaller than the packaged optical train diameter. As an example, an off the shelf relay lens such as that from Edmund Optics of Barrington, N.J., US, stock no. 45-759, can image up to an 11 mm diameter circle, but the entire relay optic is packaged in a 21 mm diameter cylindrical housing.

Near the input surface of the WFOV lens optics, the image plane is curved. This curvature of the WFOV lens input image plain can be exploited in further shortening of the intensified camera optical path. The further shortening of the optical path is achieved through the adoption of a concave fiber optic output on the exit side of an image intensifier. A concave fiber optic in combination with the depth of field of the WFOV lens enables the matching the curved image plains of the image intensifier fiber optic output and the WFOV lens. This field curvature matching enables the distance between the WFOV lens and the concave fiber output to be further reduced. The reduction in the image intensifier—WFOV lens separation results in the further shortening the receiving sensor assembly—WFOV lens—output sensor assembly optical axis.

The first lens element in the Wide Field of View (WFOV) lens assembly in the present invention does not need to be negative refractive lens. In fact, the WFOV lens of the present invention may have as the very first imaging element, a positive refractive lens.

In the known devices, there is a significant amount of effort to engineer the relay lens to preserve the image fidelity of the image being "relayed." This contrasts with the present invention in that it is acceptable to use a fisheye lens, a lens with barrel distortion, or a lens with axially symmetric distortion.

In one embodiment, the present invention is a very compact, image intensified camera system with an axially symmetric collinear optical train. The axially symmetric collinear optical train preferably consists of an image intensifier, a wide field of view (WFOV) relay lens and an output sensor assembly consisting of a camera made up of an imaging detector/sensor and associated electronics. The technical parameters of the compact wide field of view lens are such that if the image intensifier has a concave fiber optic output, it provides to the camera image sensor an in focus image at the fiber optic output surface. The small wide field of view relay lens can be a fisheye lens, which takes the image output from the image intensifier fiber optic and performs a non-rectilinear transform on the image. Other than the compact wide field of view lens, no other shell or spherical optics are required. Optionally, the camera/sensor electronics module can process, correct, and store any input imagery from the wide field of view lens into a rectilinear image in real time. Furthermore, output sensor assembly can have a display. For convenience or system compactness, the display center can be offset from the system optical axis It should also be understood that shrinking any relay optics unit located between the initial receiving optics assembly (the image intensifier tube unit for example) and the camera image sensor unit has its limitations. Shrinking the relay optics also reduces the output field of view. This could potentially result in the loss of image resolution because the WFOV lens output image would cover an area that is smaller than the pixelated chip used by the camera. The individual pixels on a camera chip cannot be reduced beyond the wavelength of light detected by the camera chips due to resolution loss.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

Figure 1:
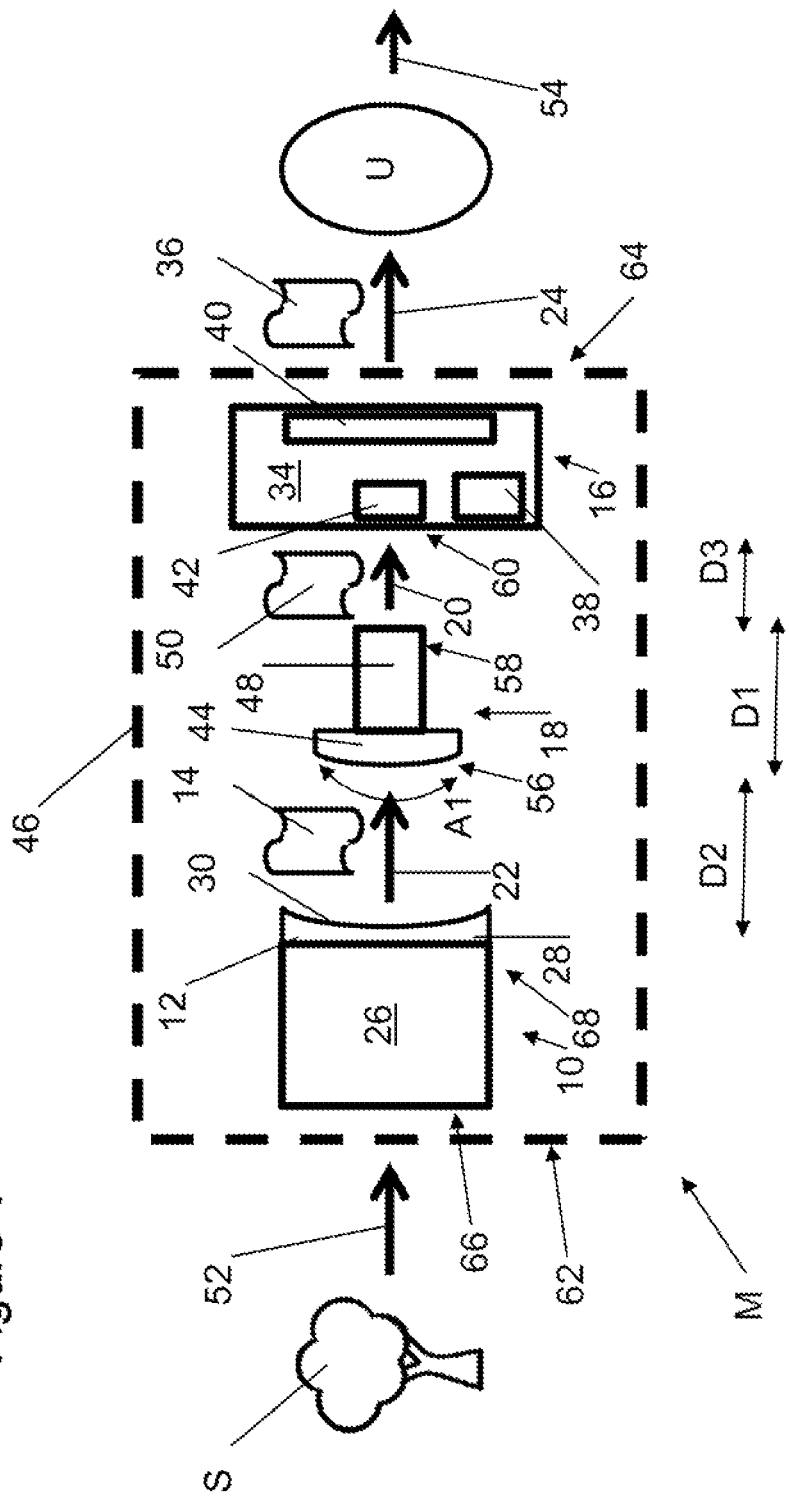
FIG. 1 is a block diagram of one version of a preferred embodiment of the present invention.

So that the manner in which the above recited features, advantages and objects of the present invention are attained can be understood in detail, a more particular description of the invention, briefly summarized above, may be had by reference to the embodiment thereof that is illustrated in the appended drawings. In all the drawings, identical numbers represent the same elements.

The present invention is a compact viewing device (M) of the type that has a receiving sensor assembly (10) with a display (12) that generates a visible output image (14) of a scene (S) that is to be imaged and an output sensor assembly (16) that receives and processes the visible output image (14) from the receiving sensor assembly (10) into an electronic image format. The viewing device (M) further includes a wide field of view (WFOV) lens assembly (18) that conveys or relays the visible output image (14) from the receiving sensor assembly (10) to the output sensor assembly (16).

The WFOV lens assembly (18) is positioned between the receiving sensor assembly (10) and the output sensor assembly (16). The WFOV lens assembly has a central longitudinal axis (20) through the WFOV lens assembly (18) that is co-linear with the central optical axis (22) of the receiving sensor assembly (10). Furthermore, the imaging center axis (24) of the input sensor (42) is co-linear with the central longitudinal axis (20) through the WFOV lens assembly (18). Preferably, the central longitudinal axis (20) the WFOV lens assembly (18), the central optical axis (22) of the receiving sensor assembly (10), and the imaging center axis (24) of the image sensor (42) are all co-linear along the longitudinal axis (54). A housing assembly (46) encloses the receiving sensor (10), the WFOV lens assembly (18), and the output sensor assembly (16) to maintain the assemblies in their co-linear relationship and to protect and also power the assemblies.

Receiving Sensor Assembly

The receiving sensor assembly (10) is any type of imaging system suitable for imaging the scene (S) in low light or other reduced visibility conditions. Examples of such receiving sensor assemblies (10) are known types of infrared or image intensifier (11) tube systems, although others may be suitable for use in the present invention.

Figure 2:
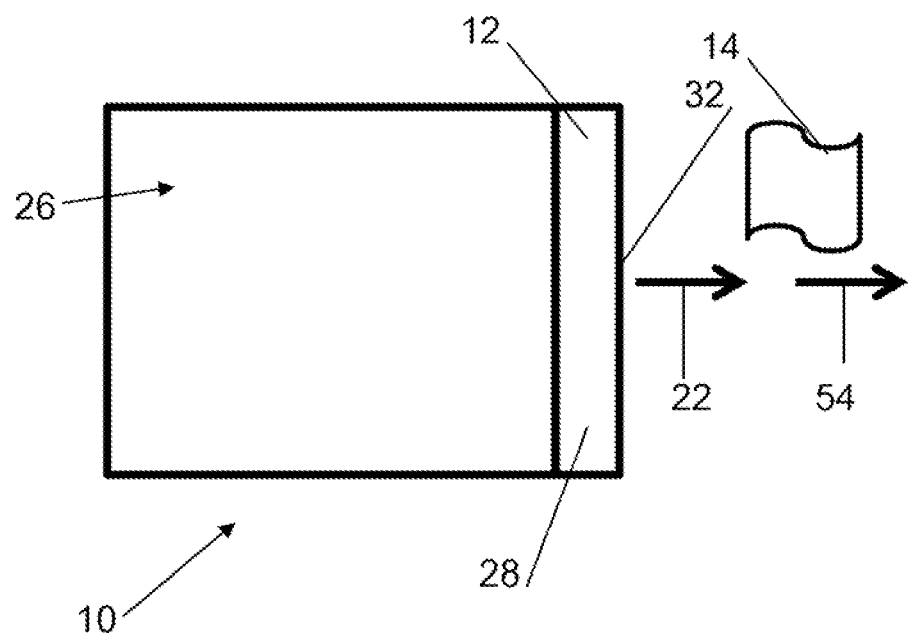
FIG. 2 is a block diagram of an alternative form of the receiving sensor assembly of the present invention.

In a preferred embodiment, the receiving sensor assembly (10) is a known image intensifier tube unit (26). The display (12) of such an image intensifier tube unit (26) may be a fiber output element (28) that has a concave shaped surface (30) for presenting the visible output image (14) to the WFOV lens assembly (18). Alternatively, as is shown in FIG. 2, the image intensifier tube (26) may include a fiber output element (28) that has a planar surface (32) for presenting the visible output image (14) to the WFOV lens assembly (18).

The display (12) of the receiving sensor or optic assembly (10) can be either an electronic display or a fiber optic bundle conveying an image, depending on the type of receiving sensor assembly (10) chosen. The display (12) can be either an internal or integral part of the receiving sensor assembly (10) or external thereto, but in communication with the other parts of the receiving sensor assembly (10).

Wide Field of View (WFOV) Lens Assembly

Shrinking the WFOV lens assembly (18) of the present invention means that the lens assembly (18) must be moved closer, that is the distance (D2) between the receiving sensor assembly (10) and the front (56) of the lens assembly (18) be reduced, to the receiving sensor or optics assembly (10) to stay in focus. As the WFOV lens assembly (18) is moved closer to the receiving optics assembly (10), to keep the same amount of area imaged constant, the field of view (A1) has to increase. While increasing the field of view (A1), the entirety of the receiving optics display (12) output has to remain in focus.

In one preferred embodiment, the lens assembly physical length (D1) of the lens assembly (18) plus focal length is around an inch (3 cm) in total. This contributes in shortening of the optic train.

Alternatively, the WFOV lens assembly (18) preferably may have a longitudinal length (D1) between 0.25 inches (0.635 cm) and 2.0 inches (5.08 cm).

The WFOV lens assembly (18) further preferably has a maximum focal length of 0.787 inches (20 mm). The short focal length of the lens assembly (18) allows positioning of the front (56) of the lens assembly (18) to within a few millimeters distance (D2) of the output from the concave fiber optic surface (30) of the intensified image tube (26).

The WFOV lens assembly may have a field of view (A1) between 50 and 181 degrees.

The above stated dimensions are believed to be critical to the present invention in order that the compact viewing device (M) is in fact compact and manageably handled by the user (U).

In one preferred embodiment, the WFOV lens assembly (18) is a fish-eye type (44) of lens. This known type of fisheye design (44) has a depth of focus to keep accurately in focus the entirety of the concave output surface (30) of a standard/known production image intensified inverter tube (26).

The concave fiber optic output of image intensified inverter tube (26) further enables the use of the WFOV lens assembly (18) and contributes to the shorter optical train by making the WFOV lens surface more equidistant from the concave fiber optic (30). The fiber optic concavity should be axially symmetric.

The WFOV lens assembly (18) may be or include a lens body or lens (48) that has axially symmetric distortion. In an alternative embodiment, the WFOV lens assembly (18) includes a lens body (48) that has non-rectilinear distortion. In a further alternative embodiment, the WFOV lens assembly (18) includes a lens body (48) that is uncorrected for chromatic aberration.

The lens angular field of view (A1) does not change with scaling. For example, if one were to take a WFOV optical assembly (18) whose angular field of view (A1) exactly imaged the receiving optic output display (12) at a given distance away, and if the diameter of this WFOV optical assembly were reduced by half, then the angular field of view would remain the same. The problem then is that the new half diameter assembly no longer completely images the receiving backend from the image intensifier tube (26). In addition, the focal length of the half diameter optic is cut in half. This means that the WFOV optical assembly (18) has to be moved even closer (D2) to the image intensifier tube (26). But, if the WFOV optical assembly (18) is moved closer, it would image even less of the receiving optic output display (12). The way the present invention overcomes the smaller size of the WFOV optical assembly is to increase the field of view of the WFOV optical assembly. Nevertheless, to increase the field of view of any optical assembly requires a completely new design, not just scaling the whole assembly. In addition, with a concave output (30) of the image intensifier tube (26), the WFOV lens assembly (18) has to be in focus across the whole field of view (A1). This means that the depth of field and the optics curvature are such that the concave backside of the image intensifier tube assembly (26) is in focus across the whole field of view. Furthermore in terms of scaling, the diameter of a compact image intensifier output is only available off the shelf in a few discrete sizes. Any other custom output diameter could be obtained only at great expense. Finally, additional restrictions on scaling revolve around how the limits on how small the output imagery for the relay optics can be. Typically, the limit of the camera sensor pixel size is around 1 micron by 1 micron due to the wave nature of light. Combined with a requirement for high resolution, the minimum area for acceptable performance is around 3 to 4 mm on a side.

Optionally, the distance (D3) between the rear (58) of the lens assembly (18) and the front (60) the camera (16) is adjustable.

Output Sensor Assembly

In a further preferred embodiment, the output sensor assembly (16) of the present invention is a camera (34). Typically, the camera (34) may generate a pixilated image (36) or other type of electronic image as desired by the user (U). The electronic image (36) generated by the output sensor assembly can be monochromatic or color.

The camera (34) further includes support electronics (38) for processing the image (50) from the lens assembly (18) and an image display (40) that can be observed by the user (U) and produces an output image (36). The image display (40) is not necessarily co-axially aligned with the central longitudinal axis (20). In a preferred embodiment, the support electronics (38) can correct lens distortion in the WFOV lens assembly (18) as desired by the user (U) and preferably correct lens distortion in real time.

The camera (34) may also include an input sensor (42) aligned with the central longitudinal axis (20). The input sensor (42) works along with the support electronics assembly (38) to generate a pixilated image.

In another embodiment, the camera (34) images between 4 and 1200 frames per second, but any appropriate speed for the viewing of the images may be utilized as a matter of design.

The camera support electronics may optionally contain software such that the camera software could correct the relay lens (18) or other inbuilt/intentional distortions to images being received.

Further, the camera (34) may include a known type of memory unit (not shown) wherein the camera images are stored for later viewing by the user (U).

Optionally, as a matter of design the output image (36) can be wirelessly transmitted to the image display (40) that can be either internal to the camera unit (34) or separated there from, such as a remote monitor (not shown).

Operation

In operation of the compact viewing device (M) of the present invention, the user (U) orients the front (62) toward an in focus scene (S) to be imaged such that the image of the scene is "seen" by the device (M) along incoming path or axis (52). The rear (64) of the compact viewing device (M) generally is pointed toward the user (U) or is elsewhere directed such that the longitudinal axis (54) through the compact viewing device (M) properly orients the device (M) and the image of the desired scene (S) is observed. Independently, the desired scene can be displayed/oriented to enhance observation or be remotely transmitted.

The light or other data forming the image of the scene (S) to be observed enters the front (66) of the receiving sensor assembly (10). The receiving sensor assembly (10) processes the incoming signal and generates a visible output image (14) of the scene (S) at a display (12) associated with the rear end (68) of the receiving optic or sensor assembly (10).

The wide field of view (WFOV) relay lens assembly (18) then conveys or relays the visible output image (14) from the receiving sensor assembly (10) to the output sensor assembly (16) with the visible output image (14) being optically communicated through the lens assembly (18) from its front end (56) to its back end (58).

The output sensor assembly (16) then receives and processes the visible output image (50) conveyed by the WFOV lens assembly (18) from the receiving sensor assembly (10) into a desired electronic image format.

The camera input sensor (42) receives the visible image (50) and converts it into an electronic format. The support electronics unit (38) of the camera (34) processes the electronic image to correct for distortions or other imperfections introduced by the transmission of the original input image through the device.

A display (40) associated with the camera (34) produces the output image (36) of the scene (S) to be seen by the user (U). For convenience or for system compactness, the display (40) does not have to be coaxial with the central longitudinal axis (20).

The display (40) can optionally be mounted with the rear end (64) of the device (M) or be separated therefrom by a remote connection (not shown).

The foregoing disclosure and description of the invention are illustrative and explanatory thereof, and various changes in the size, shape and materials, as well as in the details of the illustrated construction may be made without departing from the spirit of the invention.

The invention claimed is:

1. A viewing device (M) of the type including a receiving sensor assembly (10) having a display (12) generating a visible output image (14) and an output sensor assembly (16) for receiving and processing the visible output image (14) from the receiving sensor assembly (10) into an electronic image format, and the viewing device (M) further including a wide field of view (WFOV) lens assembly (18) for conveying the visible output image (14) from the receiving sensor assembly (10) to the output sensor assembly (16); the WFOV lens assembly (18) being positioned between the receiving sensor assembly (10) and the output sensor assembly (16), and having a central longitudinal axis (20) through the WFOV lens assembly (18) being co-linear with a central optical axis (22) of the receiving sensor assembly (10) and the output sensor assembly (16) having an optically centered input sensor (42) that is co-linear with the central longitudinal axis (20) through the WFOV lens assembly (16).

2. The viewing device of claim 1 wherein the receiving sensor assembly (10) is an image intensifier tube (26).

3. The viewing device of claim 2 wherein the display (12) of the image intensifier tube (26) is a fiber output element (28) having a concave shaped surface (30) for presenting the visible output image (14) to the WFOV lens assembly (18).

4. The viewing device of claim 2 wherein the image intensifier tube (26) includes a fiber output element (28) having a planar surface (32) for presenting the visible output image (14) to the WFOV lens assembly (18).

5. The viewing device of claim 1 wherein the output sensor assembly (16) is a camera (34).

6. The viewing device of claim 5 wherein the camera (34) generates a pixilated image (36).

7. The viewing device of claim 5 wherein the camera (34) includes support electronics (38) and an image display (40).

8. The viewing device of claim 5 wherein the camera (34) includes support electronics (38) and an image display (40), and further the support electronics (38) can correct lens distortion in the WFOV lens assembly (18) in real time.

9. The viewing device of claim 5 wherein the camera (34) includes a pixilated input sensor (42).

10. The viewing device of claim 5 wherein the WFOV lens assembly (18) is uncorrected for chromatic aberration.

11. The viewing device of claim 1 wherein the WFOV lens assembly (18) has a longitudinal length (D1) between 0.25 inches (0.635 cm) and 4.0 inches (10.16 cm).

12. The viewing device of claim 1 wherein the WFOV lens assembly (18) has a maximum focal length of 0.787 inches (20 mm).

13. The viewing device of claim 1 wherein the WFOV lens assembly has a field of view (A1) between 50 and 181 degrees.

14. The viewing device of claim 1 wherein the WFOV lens assembly (18) is a fish-eye type (44) of lens.

15. The viewing device of claim 1 further including a housing assembly (46) to enclose the receiving sensor (10), the WFOV lens assembly (18), and the output sensor assembly (16) in their co-linear relationship.

16. The viewing device of claim 1 wherein the WFOV lens assembly (18) includes a lens (48) with axially symmetric distortion.

17. The viewing device of claim 1 wherein the WFOV lens assembly (18) includes a lens (48) with non-rectilinear distortion.

18. A compact image intensified camera device (M) including an image intensifier assembly (26) having a display (12) generating a visible output image (14), an output camera assembly (16) for receiving and processing the visible output image (14) from the image intensifier assembly (10) into an electronic image format, and a wide field of view (WFOV) lens assembly (18) for conveying the visible output image (14) from the image intensifier assembly (26) to the output camera assembly (16); the WFOV lens assembly (16) being positioned between the image intensifier assembly (26) and the output camera assembly (16), and having a central longitudinal axis (20) through the WFOV lens assembly (18) being co-linear with a central optical axis (22) of the image intensifier assembly (10) and the output camera assembly (16) having an optically centered input sensor (42) that is co-linear with the central longitudinal axis (20) through the WFOV lens assembly (16).

* * * * *